United States Patent
Araki et al.

(10) Patent No.: US 8,333,067 B2
(45) Date of Patent: Dec. 18, 2012

(54) ENGINE AND VEHICLE

(75) Inventors: Yuuji Araki, Shizuoka (JP); Masaki Torigoshi, Shizuoka (JP); Toshihiko Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1064 days.

(21) Appl. No.: 12/107,128

(22) Filed: Apr. 22, 2008

(65) Prior Publication Data

US 2008/0264395 A1 Oct. 30, 2008

(30) Foreign Application Priority Data

Apr. 24, 2007 (JP) .................. 2007-113954

(51) Int. Cl.
*F01N 3/10* (2006.01)

(52) U.S. Cl. .......................... 60/304; 60/305

(58) Field of Classification Search .............. 60/277, 60/292, 293, 304, 305, 306
See application file for complete search history.

(56) References Cited

U.S. PATENT DOCUMENTS

| | | | | |
|---|---|---|---|---|
| 3,953,969 A | * | 5/1976 | Mori et al. ............. | 60/293 |
| 5,657,628 A | * | 8/1997 | Takeuchi .............. | 60/293 |
| 6,763,660 B2 | * | 7/2004 | Matsuzawa ............ | 60/323 |
| 7,111,454 B2 | | 9/2006 | Fulcher et al. | |
| 2006/0090455 A1 | * | 5/2006 | Wakahara et al. ....... | 60/277 |
| 2006/0130805 A1 | | 6/2006 | Juretzka et al. | |

FOREIGN PATENT DOCUMENTS

| | | |
|---|---|---|
| DE | 199 43 132 A1 | 3/2000 |
| GB | 108390 | 8/1917 |
| JP | 2000-054831 A | 2/2000 |
| JP | 2002-174146 A | 6/2002 |
| JP | 2004-108180 A | 4/2004 |
| JP | 2005-120961 A | 5/2005 |
| JP | 2005-163629 A | 6/2005 |
| JP | 2006-329003 A | 12/2006 |
| JP | 2006329003 A * | 12/2006 |

OTHER PUBLICATIONS

Official communication issued in counterpart European Application No. 08007784.5, mailed on Aug. 5, 2008.
Official Communication issued in corresponding Japanese Patent Application No. 2007-113954, mailed on May 17, 2011.

* cited by examiner

*Primary Examiner* — Thomas Denion
*Assistant Examiner* — Patrick Maines
(74) *Attorney, Agent, or Firm* — Keating & Bennett, LLP

(57) ABSTRACT

An engine includes a cylinder, an exhaust port, an exhaust valve, a secondary air supply pipe, and an electromagnetic valve. The electromagnetic valve is opened in a predetermined time period after a point in time when a lift amount of the exhaust valve reaches about half a maximum value during a time period in which an opening of the exhaust port is opened. This causes air to be supplied from a secondary air supply pipe to the exhaust port.

7 Claims, 10 Drawing Sheets

F I G. 6
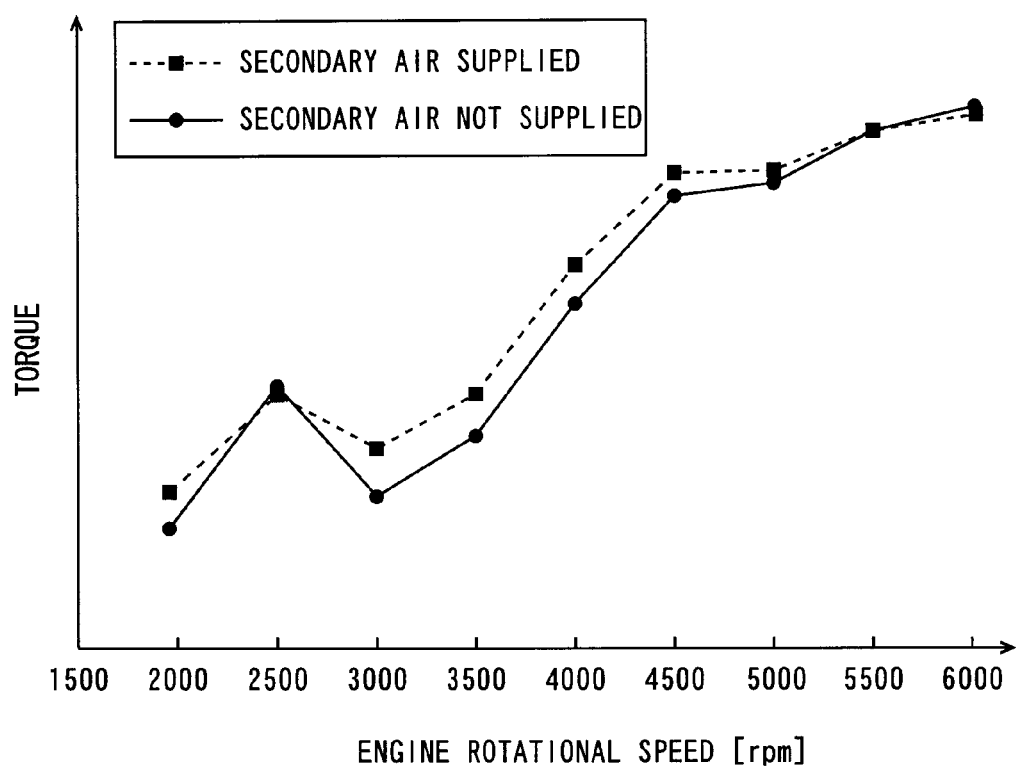

ENGINE AND VEHICLE

BACKGROUND OF THE INVENTION

1. Field of the Invention

The present invention relates to an engine that burns an air-fuel mixture using secondary air and a vehicle including the same.

2. Description of the Related Art

Conventionally, engines using an internal EGR (Exhaust Gas Recirculation) technique have been developed (see JP 2002-174146 A, for example).

In the engine using the internal EGR technique, an exhaust gas in an exhaust port is taken into a cylinder in an intake stroke. This causes the oxygen concentration in the cylinder to be lowered to decrease a combustion temperature of an air-fuel mixture. As a result, heat loss of the engine can be minimized and $NO_x$ (nitrogen oxide) in the exhaust gas can be reduced. In addition, the exhaust gas is taken into the cylinder so that pumping loss of the engine can be decreased.

In the internal EGR technique, however, since the exhaust gas is taken into the cylinder as described above, the amounts of $CO_2$ (carbon dioxide) and water vapor in the cylinder are increased. This causes combustion efficiency of the engine to be lowered, so that output characteristics of the engine cannot be sufficiently improved. Moreover, supply of the exhaust gas into the cylinder increases HC (hydrocarbon) and CO (carbon monoxide) in the cylinder, so that the exhaust gas cannot be sufficiently purified in some cases.

SUMMARY OF THE INVENTION

In order to overcome the problems described above, preferred embodiments of the present invention provide an engine capable of improving output characteristics while purifying an exhaust gas, and a vehicle including the same.

According to a preferred embodiment of the present invention, an engine includes a cylinder that includes a combustion chamber, an exhaust port that includes an opening into the combustion chamber that is arranged to exhaust a combustion gas that is in the combustion chamber, an exhaust valve that is provided at the opening of the exhaust port and opens the opening during a first time period and closes the opening during a second time period, and an air supply mechanism that preferably, during the first time period, does not supply air to the exhaust port until a lift amount of the exhaust valve reaches about half a maximum value, and supplies air to the exhaust port during a predetermined time period after a point in time at which the lift amount of the exhaust valve reaches about half the maximum value.

In the present preferred embodiment of the engine, air is preferably supplied to the exhaust port by the air supply mechanism during the predetermined time period after the point in time at which the lift amount of the exhaust valve reaches about half the maximum value in the first period in which the exhaust valve is opened.

In this case, the air supplied to the exhaust port flows from the exhaust port into the combustion chamber by pulsation caused by pressure fluctuations in the exhaust port. This improves charging efficiency in the combustion chamber, thereby improving combustion efficiency. As a result, output characteristics of the engine can be improved while HC (hydrocarbon) and CO (carbon monoxide) in the exhaust gas can be reduced.

In addition, since the air is supplied from the side of the exhaust port, the air can be evenly dispersed in the combustion chamber. This enables stable combustion of the air-fuel mixture and stabilizes the output of the engine.

Since the exhaust gas and the air are mixed in the exhaust port, HC and CO in the exhaust gas can be efficiently oxidized. This allows the exhaust gas to be efficiently purified.

Since the pulsation caused by the pressure fluctuations in the exhaust port causes the air to be efficiently taken into the combustion chamber, the air supplied to the exhaust port can be prevented from flowing into a catalyst device in large volumes even when the catalyst device is provided at the downstream side of the exhaust port. That is, excessive oxygen can be prevented from flowing into the catalyst device. Accordingly, purification efficiency of the catalyst device can be improved.

Moreover, the air is not supplied to the exhaust port until the lift amount of the exhaust valve reaches about half the maximum value. In this case, excessive air can be prevented from flowing into the catalyst device together with the exhaust gas exhausted from the combustion chamber when the opening of the exhaust port is opened. This further improves the purification efficiency of the catalyst device.

The air supply mechanism preferably supplies air to the exhaust port during a predetermined time period after a point in time at which the lift amount of the exhaust valve reaches the maximum value.

In this case, the air supplied to the exhaust port can flow into the combustion chamber with sufficient efficiency. This sufficiently improves the combustion efficiency of the engine. In addition, when the catalyst device is provided at the downstream side of the exhaust port, the excessive air can be sufficiently prevented from flowing into the catalyst device. Accordingly, the purification efficiency of the catalyst device can be sufficiently improved.

The air supply mechanism preferably supplies air to the exhaust port when the combustion gas flows from the exhaust port to the combustion chamber.

In this case, the combustion gas that flows from the exhaust port to the combustion chamber allows the air supplied to the exhaust port to reliably flow into the combustion chamber. Accordingly, the combustion efficiency of the engine can be reliably improved.

The air supply mechanism preferably supplies air to the exhaust port when pressure in the exhaust port is higher than pressure in the combustion chamber.

In this case, a difference between pressure in the exhaust port and pressure in the combustion chamber allows the air supplied to the exhaust port to reliably flow into the combustion chamber. Thus, the combustion efficiency of the engine can be reliably improved.

The engine preferably further includes an exhaust pipe coupled to a downstream end of the exhaust port, and a catalyst device provided in the exhaust pipe.

In this case, the exhaust gas in the engine can be reliably purified by the catalyst device. In addition, since excessive air (oxygen) is prevented from flowing into the catalyst device, the purification efficiency of the catalyst device can be improved.

The air supply mechanism preferably supplies air to the exhaust port until the first time period has ended.

In this case, HC and CO in the exhaust gas can be sufficiently oxidized while the air supplied to the exhaust port can reliably flow into the combustion chamber. Accordingly, the exhaust gas can be sufficiently purified while the output characteristics of the engine can be sufficiently improved.

According to another preferred embodiment of the present invention, a vehicle includes a drive wheel, an engine, and a transmission mechanism that transmits power generated by the engine to the drive wheel, wherein the engine includes a cylinder that includes a combustion chamber, an exhaust port that includes an opening into the combustion chamber and exhausts a combustion gas that is in the combustion chamber, an exhaust valve that is provided at the opening of the exhaust port, and opens the opening during a first time period and closes the opening during a second time period, and an air supply mechanism that preferably, during the first time period, does not supply air to the exhaust port until a lift amount of the exhaust valve reaches about half a maximum value, and supplies air to the exhaust port during a predetermined time period after a point in time at which the lift amount of the exhaust valve reaches about half the maximum value.

In the present preferred embodiment, the power generated by the engine is transmitted to the drive wheel through the transmission mechanism. This causes the vehicle to drive.

In the engine of this vehicle, the air is preferably supplied to the exhaust port by the air supply mechanism during the predetermined time period after the point in time at which the lift amount of the exhaust valve reaches about half the maximum value during the first time period in which the exhaust valve is opened.

In this case, the air supplied to the exhaust port flows from the exhaust port into the combustion chamber by pulsation caused by pressure fluctuations in the exhaust port. This improves charging efficiency in the combustion chamber, thereby improving combustion efficiency. As a result, output characteristics of the engine can be improved while HC (hydrocarbon) and CO (carbon monoxide) in the exhaust gas can be reduced.

In addition, since the air is preferably supplied from the side of the exhaust port, the air can be evenly dispersed in the combustion chamber. This enables stable combustion of the air-fuel mixture and stabilizes output of the engine.

Since the exhaust gas and the air are mixed in the exhaust port, HC and CO in the exhaust gas can be efficiently oxidized. This allows the exhaust gas to be efficiently purified.

Since the air is efficiently taken into the combustion chamber by the pulsation caused by the pressure fluctuations in the exhaust port, the air supplied to the exhaust port can be prevented from flowing into a catalyst device in large volumes even when the catalyst device is provided at the downstream side of the exhaust port. That is, excessive air can be prevented from flowing into the catalyst device. Accordingly, purification efficiency of the catalyst device can be improved.

Moreover, the air is preferably not supplied to the exhaust port until the lift amount of the exhaust valve reaches about half the maximum value. In this case, the excessive air can be prevented from flowing into the catalyst device together with the exhaust gas exhausted from the combustion chamber when the opening of the exhaust port is opened. This further improves the purification efficiency of the catalyst device.

As a result of the various preferred embodiments described above, a purification rate of the exhaust gas can be improved while the traveling performance of the vehicle can also be improved.

Other features, elements, characteristics, and advantages of the present invention will become more apparent from the following description of preferred embodiments of the present invention with reference to the attached drawings.

BRIEF DESCRIPTION OF THE DRAWINGS

FIG. 6 is a diagram showing a relationship between an output torque and a rotational speed of the engine in a state where a throttle valve is fully opened.

DESCRIPTION OF THE PREFERRED EMBODIMENTS

An engine according to preferred embodiments of the present invention and a vehicle including the same will now be described with reference to the drawings. Note that a motorcycle is described as an example of the vehicle in the following description, but the present invention is not limited to a motorcycle.

Configuration of the Motorcycle

Figure 1:
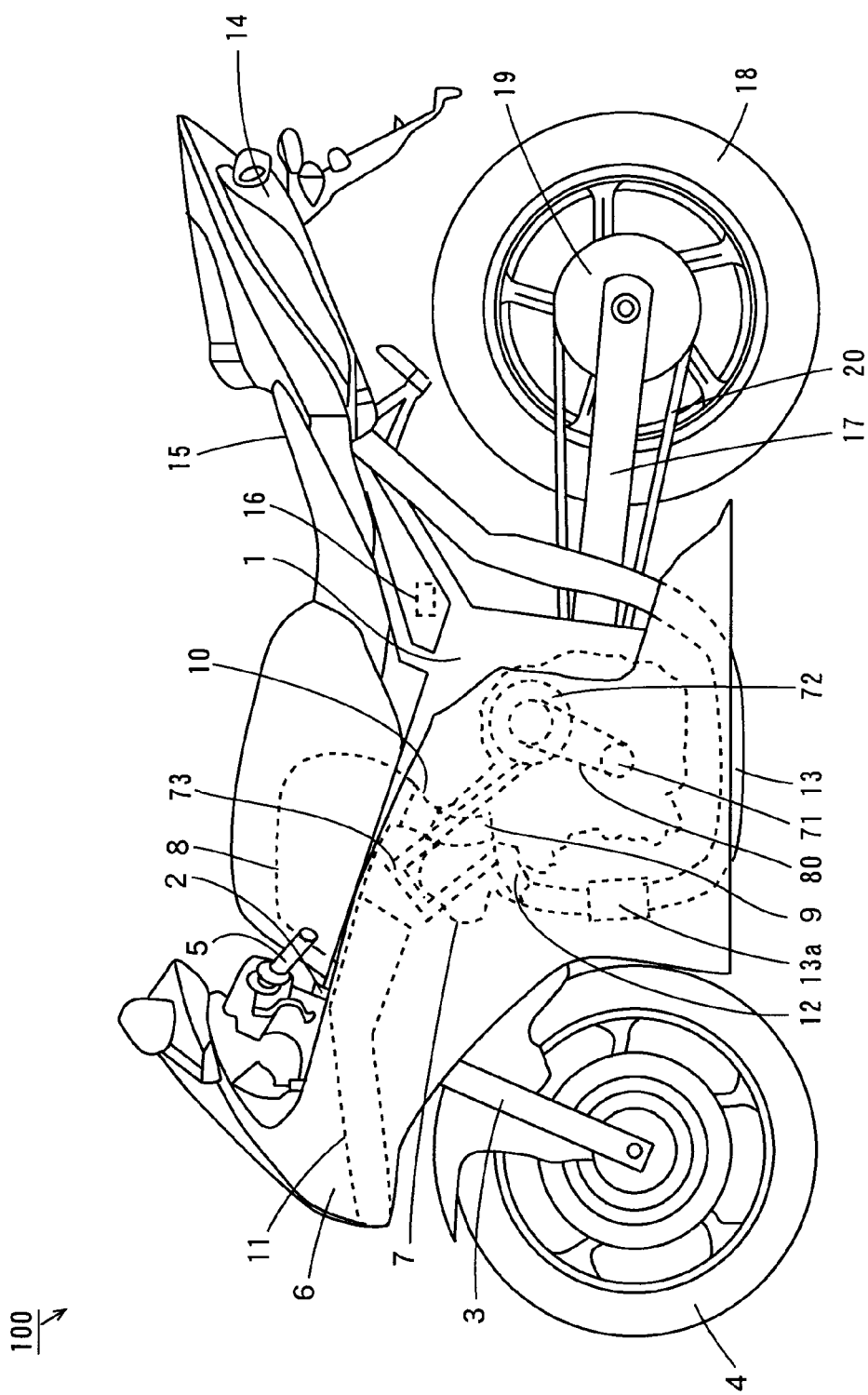
FIG. 1 is an external side view showing a motorcycle including an engine according to a preferred embodiment of the present invention.

FIG. 1 is an external side view showing the motorcycle including the engine according to a preferred embodiment of the present invention.

As shown in FIG. 1, the motorcycle 100 includes a main frame 1. The main frame 1 is provided with a head pipe 2 at its front end. The head pipe 2 is provided with a front fork 3 that can turn. A front wheel 4 is rotatably supported at a lower end of the front fork 3. A handle 5 is attached to an upper end of the head pipe 2.

A cowling 6 is arranged so as to cover a front and sides of the main frame 1. An engine 7 is provided at the approximate center of the main frame 1. An air cleaner box 8 is provided above the engine 7. A throttle body 10 is arranged so as to connect the air cleaner box 8 and an intake port 9 of the engine 7.

An intake passage 11 that communicates the air cleaner box 8 to the outside is arranged so as to be covered with the cowling 6 at the front of the motorcycle 100. An end of the intake passage 11 opens at a front side of the cowling 6. Thus, outside air is taken into the engine 7 through the intake passage 11, the air cleaner box 8, the throttle body 10, and the intake port 9.

An end of an exhaust pipe 13 is connected to an exhaust port 12 of the engine 7. A catalyst device 13a for purifying an exhaust gas exhausted from the engine 7 is inserted in the exhaust pipe 13. The catalyst device 13a is preferably a three-way catalyst, for example. A muffler device 14 is connected to the other end of the exhaust pipe 13. The exhaust gas in the engine 7 is exhausted to the outside through the exhaust port 12, the exhaust pipe 13, and the muffler device 14.

A seat 15 is provided above the engine 7. An ECU (Electronic Control Unit) 16 that controls an operation of each part of the motorcycle 100 is provided below the seat 15. Details of the ECU 16 will be described later.

A rear arm 17 is connected to the main frame 1 so as to extend toward the back of the engine 7. The rear arm 17 holds a rear wheel 18 and a rear wheel driven sprocket 19 in a rotatable manner. A torque of a crankshaft 71 of the engine 7 is transmitted to the rear wheel driven sprocket 19 through a transmission (not shown) and a chain 20. This causes the rear wheel 18 to rotate.

An air pump 72 and a secondary air supply pipe 73 are preferably provided at the approximate center of the main frame 1. One end of the secondary air supply pipe 73 is connected to the exhaust port 12 of the engine 7, and the other end is connected to the air pump 72.

The torque of the crankshaft 71 of the engine 7 is transmitted to the air pump 72 through a transmission belt 80. Accordingly, secondary air is supplied from the air pump 72 to the exhaust port 12 through the secondary air supply pipe 73. Effects of supplying the secondary air to the exhaust port 12 will be described later.

Configuration of the Engine and a Control System

Next, the engine 7 of FIG. 1 and a control system thereof are described.

Figure 2:
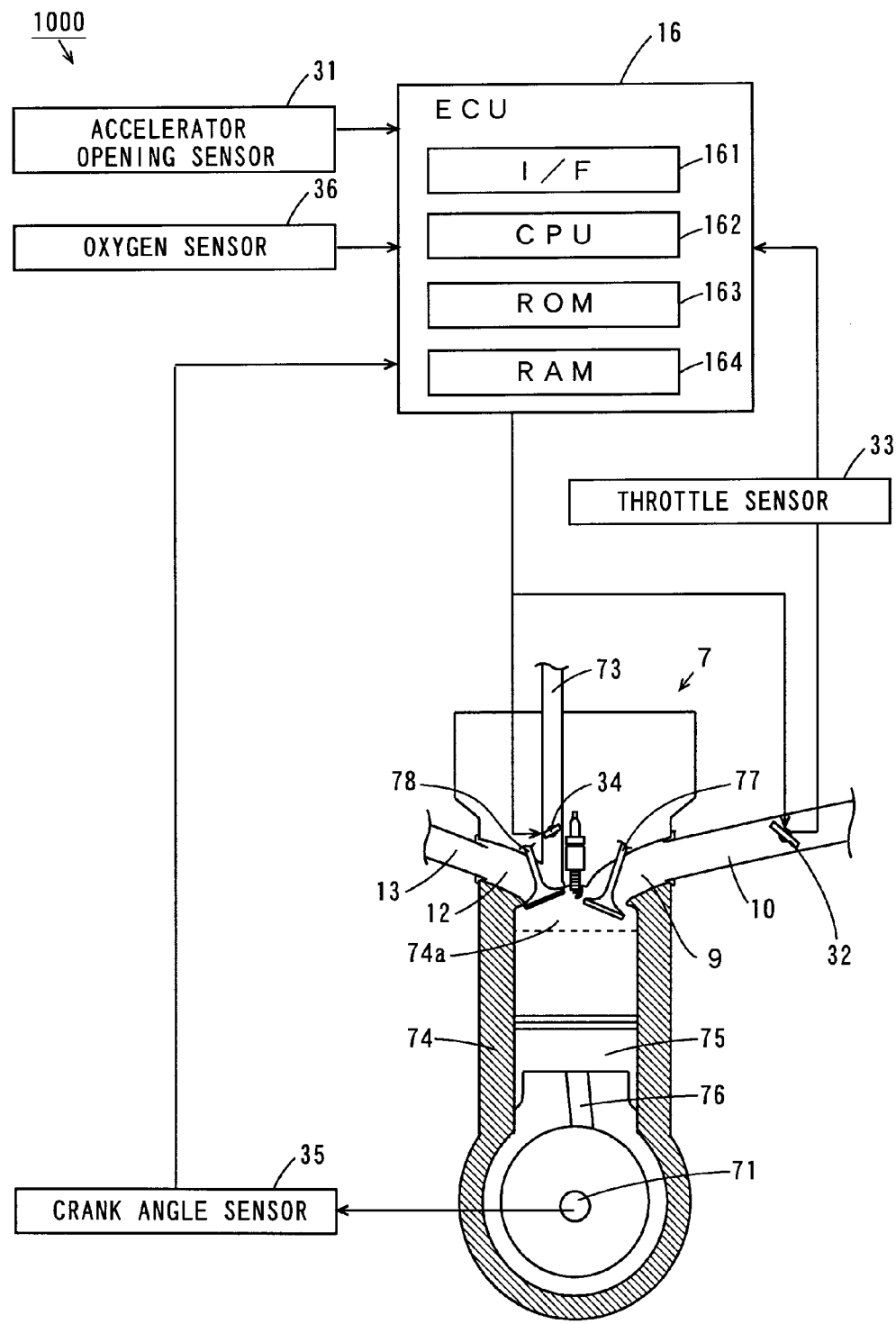
FIG. 2 is a diagram showing a general configuration of a control system of the engine.

FIG. 2 is a diagram showing a general configuration of the control system of the engine 7. As shown in FIG. 2, the control system 1000 according to the present preferred embodiment includes the engine 7, the ECU 16, an accelerator opening sensor 31, a throttle valve 32, a throttle sensor 33, an electromagnetic valve 34, a crank angle sensor 35, an oxygen sensor 36, and the secondary air supply pipe 73.

The engine 7 includes a cylinder 74, in which a piston 75 is arranged so as to move up and down. The piston 75 is coupled to the crankshaft 71 by a connecting rod 76 and a crank (not shown). A combustion chamber 74a for burning an air-fuel mixture is provided at an upper portion inside the cylinder 74. The intake port 9 and the exhaust port 12 are arranged so as to communicate with the combustion chamber 74a.

An intake valve 77 capable of opening and closing is arranged at a downstream opening of the intake port 9, and an exhaust valve 78 capable of opening and closing is arranged at an upstream opening of the exhaust port 12. The air-fuel mixture (the combustion gas) burned in the combustion chamber 74a flows to the outside through the exhaust port 12 and the exhaust pipe 13 as the exhaust gas.

The accelerator opening sensor 31 detects an opening of an accelerator (an accelerator opening) provided on the handle 5 (FIG. 1). The throttle valve 32 is provided in the throttle body 10, and adjusts an amount of air taken into the cylinder 74. The throttle sensor 33 detects an opening of the throttle valve 32 (a throttle opening).

The one end of the secondary air supply pipe 73 is connected to the exhaust port 12 on the side of the combustion chamber 74a. The electromagnetic valve 34 is provided within the secondary air supply pipe 73. The ECU 16 controls opening/closing of the electromagnetic valve 34. The ECU 16 controls the electromagnetic valve 34 to open, whereby the secondary air is supplied from the secondary air supply pipe 73 to the exhaust port 12. The crank angle sensor 35 detects a rotation angle (a crank angle) of the crankshaft 71. The oxygen sensor 36 detects the oxygen concentration in the exhaust pipe 13.

The ECU 16 preferably includes an I/F (interface) 161, a CPU (central processing unit) 162, a ROM (read only memory) 163, and a RAM (random access memory) 164.

The accelerator opening detected by the accelerator opening sensor 31, the throttle opening detected by the throttle sensor 33, the crank angle detected by the crank angle sensor 35, and the oxygen concentration detected by the oxygen sensor 36 are supplied to the CPU 162 through the I/F 161. A control program of the CPU 162 is stored in the ROM 163. Various types of data related to the control system 1000 are stored in the RAM 164. In addition, the RAM 164 functions as a processing area of the CPU 162.

The CPU 162 controls opening/closing of the throttle valve 32 based on the detected value of the accelerator opening sensor 31 and the detected value of the oxygen sensor 36. Moreover, the CPU 162 controls the opening/closing of the electromagnetic valve 34 based on the detected value of the throttle sensor 33, the detected value of the crank angle sensor 35, the detected value of the oxygen sensor 36, and the data stored in the RAM 164. Details of control operations of the CPU 162 will be described later.

Supply Timing of the Secondary Air

The inventors of the present application have discovered the appropriate supply timing of the secondary air for improving combustion efficiency (an output) of the engine 7 and purifying the exhaust gas in the engine 7. Details of the appropriate supply timing of the secondary air will now be described.

Figure 3:
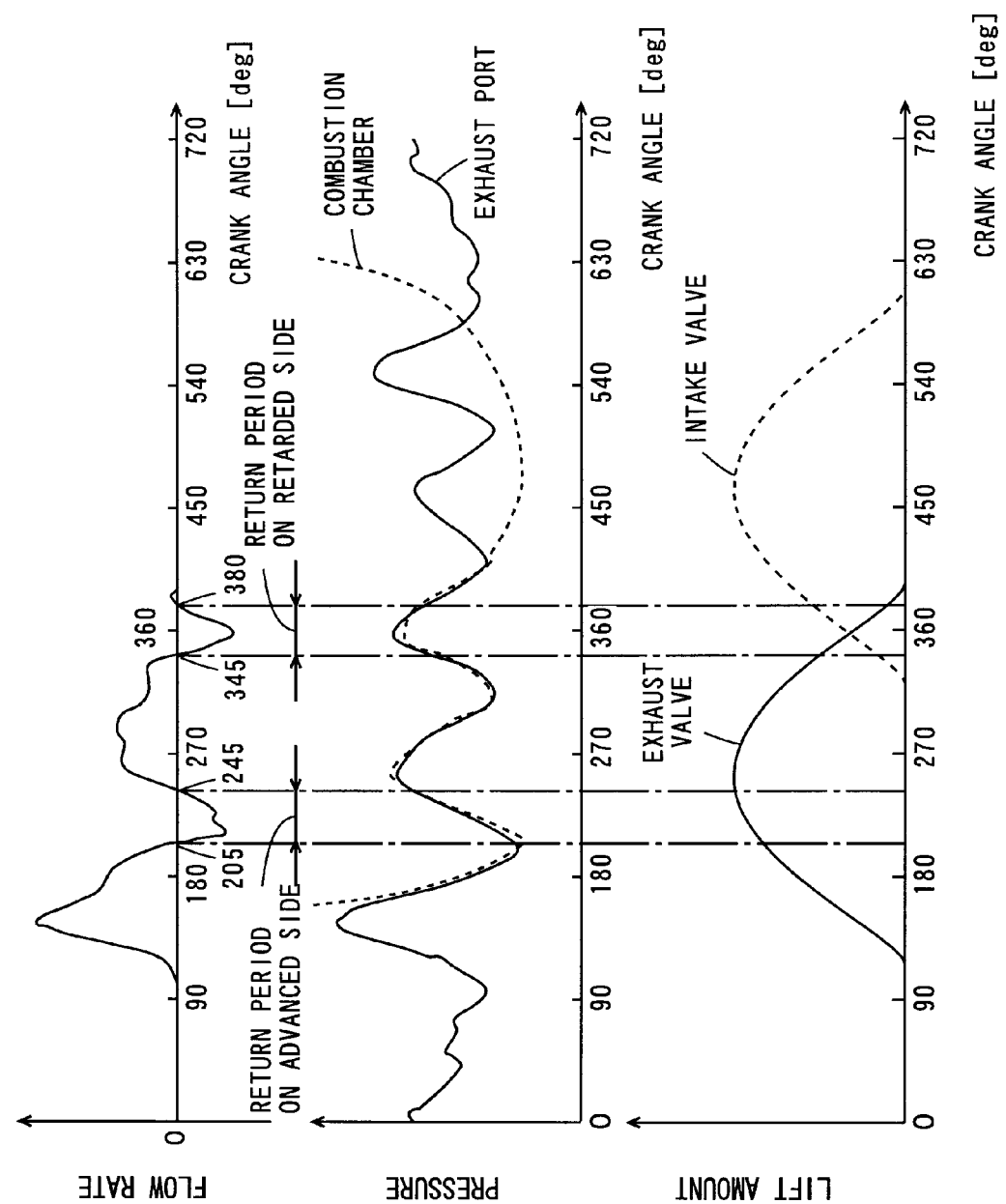
FIG. 3 is a diagram explaining supply timing of secondary air.

FIG. 3 is a diagram explaining the supply timing of the secondary air. In FIG. 3, (a) is a diagram showing a flow rate of the exhaust gas that flows from the combustion chamber 74a to the exhaust port 12, (b) is a diagram showing a relationship between pressure in the combustion chamber 74a and pressure in the exhaust port 12, and (c) is a diagram showing lift amounts (displacements) of the intake valve 77 and the exhaust valve 78. Note that FIG. 3 shows an example of data when the rotational speed of the engine 7 is approximately 3000 rpm, for example.

Note that the abscissas of FIGS. 3(a) to 3(c) show the crank angle, the ordinate of FIG. 3(a) shows the flow rate, the ordinate of FIG. 3(b) shows the pressure, and the ordinate of FIG. 3(c) shows the lift amount. When the crank angle in FIG. 3(a) to (c) is 0°, 360°, and 720°, the piston 75 of the engine 7 is positioned at the top dead center.

In FIG. 3(b), the solid line indicates the pressure in the exhaust port 12, and the dotted line indicates the pressure in the combustion chamber 74a. In FIG. 3(c), the solid line indicates the lift amount of the exhaust valve 78, and the dotted line indicates the lift amount of the intake valve 77.

As shown in FIGS. 3(a) and (c), the flow rate of the exhaust gas that flows from the combustion chamber 74a to the exhaust port 12 (hereinafter abbreviated as the flowing gas) is zero when the exhaust valve 78 is closed. The flow rate of the flowing gas increases with the lift amount of the exhaust valve 78 during a time period from a point in time at which the exhaust valve 78 is opened to a point in time at which the crank angle becomes about 150°. The flow rate of the flowing gas then decreases, and becomes zero when the crank angle is about 205°, for example.

When the crank angle is between about 205° and about 245°, the exhaust gas returns from the exhaust port 12 to the combustion chamber 74a. Thereafter, the exhaust gas flows again from the combustion chamber 74a to the exhaust port 12, and the flow rate of the flowing gas increases until the crank angle becomes about 260°. After that, the flow rate of the flowing gas again decreases, and becomes zero when the crank angle is about 345°.

When the crank angle is between 345° and about 380°, the exhaust gas again returns from the exhaust port 12 to the combustion chamber 74a. Thereafter, the flow rate of the flowing gas slightly increases. The exhaust valve 78 is closed when the crank angle is about 390°, so that the flow rate of the flowing gas becomes zero.

In the present preferred embodiment, the electromagnetic valve 34 (FIG. 2) is opened and the secondary air is supplied from the secondary air supply pipe 73 (FIG. 2) to the exhaust port 12 during a time period in which the crank angle is about 345° to about 380° of the above-described two time periods in which the exhaust gas returns (hereinafter referred to as the return periods). In this case, the secondary air can be efficiently supplied to the combustion chamber 74a by the exhaust gas that returns from the exhaust port 12 to the combustion chamber 74a. This improves charging efficiency of the engine 7, thereby improving the combustion efficiency. Details of the effects of the secondary air will be described later.

Note that the pressure in the combustion chamber 74a is lower than the pressure in the exhaust port 12 in the return periods as shown in FIG. 3(b). Accordingly, the secondary air may be supplied to the exhaust port 12 when the pressure in the combustion chamber 74a is lower than the pressure in the exhaust port 12.

Control Operation of the ECU

The relationship shown in FIG. 3 changes depending on the rotational speed and the throttle opening of the engine 7. In the present preferred embodiment, a relationship among the rotational speed of the engine 7, the throttle opening of the engine 7, and the time periods in which the exhaust gas returns (the return periods) is preferably derived in advance from experiments and simulations at the time of manufacturing the engine 7. The derived relationship is stored in the RAM 164 of the ECU 16. The CPU 162 of the ECU 16 controls the opening/closing operation of the electromagnetic valve 34 based on the above-described relationship stored in the RAM 164.

Figure 4:
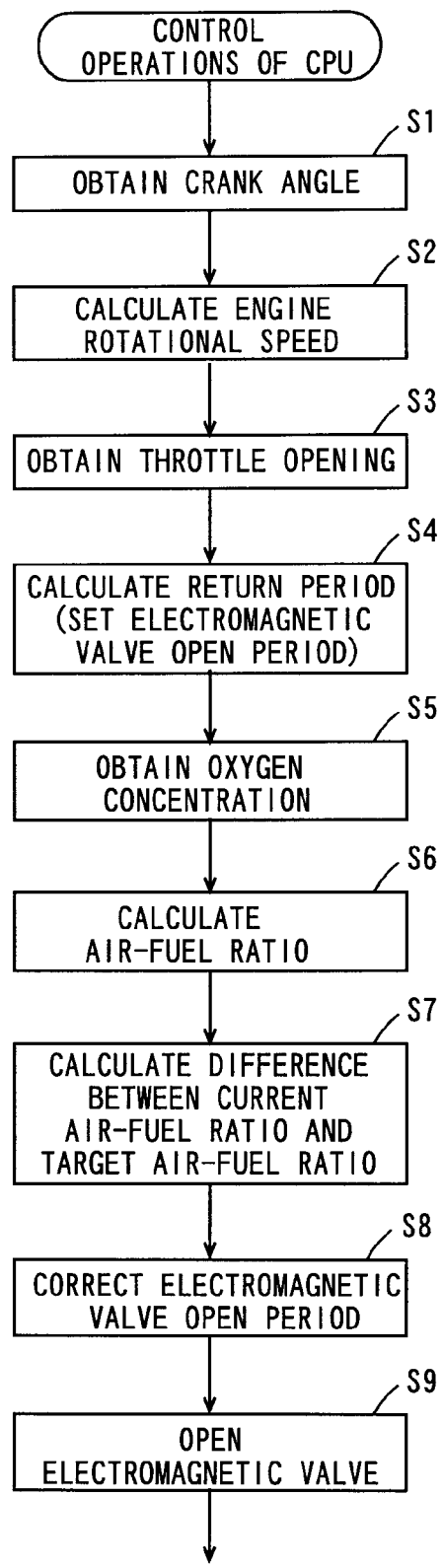
FIG. 4 is a flowchart showing control operations of a CPU.

FIG. 4 is a flowchart showing the control operations of the CPU 162.

As shown in FIG. 4, first, the CPU 162 obtains the crank angle from the crank angle sensor 35 (step S1). Next, the CPU 162 calculates the rotational speed of the engine 7 based on the crank angle obtained in step S1 (step S2). The CPU 162 subsequently obtains the throttle opening from the throttle sensor 33 (step S3).

Next, the CPU 162 calculates the return period from the crank angle obtained in step S1, the rotational speed of the engine 7 calculated in step S2, the throttle opening obtained in step S3, and the relationship stored in the RAM 164 (step S4). At this time, the CPU 162 sets the calculated return period as an open period of the electromagnetic valve 34 (hereinafter referred to as an electromagnetic valve open period).

Then, the CPU 162 obtains the oxygen concentration from the oxygen sensor 36 (step S5). The CPU 162 subsequently calculates the air-fuel ratio in the exhaust pipe 13 based on the oxygen concentration obtained in step S5 (step S6).

Next, the CPU 162 calculates a difference between the air-fuel ratio calculated in step S6 and a target air-fuel ratio (step S7). Note that the target air-fuel ratio is preset depending on the rotational speed of the engine 7, the throttle opening of the engine 7 and the like, for example, and stored in the RAM 164 of the ECU 16 (FIG. 2).

The CPU 162 subsequently corrects the electromagnetic valve open period set in step S4 based on the difference calculated in step S7 so that the air-fuel ratio in the exhaust pipe 13 becomes the target air-fuel ratio (step S8). Note that the CPU 162 corrects the electromagnetic valve open period by, for example, adjusting the timing of closing the electromagnetic valve 34 in step S8.

Thereafter, the CPU 162 opens the electromagnetic valve 34 based on the electromagnetic valve open period corrected in step S8 (step S9). Accordingly, the secondary air is supplied to the exhaust port 12 in the return period.

Note that the return period (the electromagnetic valve open period) calculated in step S4 is a time period within an overlapping time period (a period of time in which both the intake valve 77 and the exhaust valve 78 are opened) of the engine 7. In the example shown in FIG. 3(a), for example, the return period on the retarded side is set as the electromagnetic valve open period in step S4. Thus, the secondary air is taken into the combustion chamber 74a in the overlapping period in the present preferred embodiment.

In addition, an amount of the secondary air supplied to the exhaust port 12 is adjusted so that the air-fuel ratio in the exhaust pipe 13 (FIG. 2) becomes the target air-fuel ratio in the present preferred embodiment. This easily improves the output characteristics of the engine 7. Moreover, purification efficiency of the catalyst device 13a is improved when the target air-fuel ratio is a theoretical air-fuel ratio.

While the air-fuel ratio in the exhaust pipe 13 is adjusted by adjusting the electromagnetic valve open period by the CPU 162 in the example shown in FIG. 4, the air-fuel ratio in the exhaust pipe 13 may be adjusted by adjusting a fuel injection period.

While the throttle opening is obtained by the CPU 162 in step S3 in the example shown in FIG. 4, the throttle opening may be obtained before the crank angle is obtained (step S1) or before the engine rotational speed is calculated (step S2).

Effects of the Present Preferred Embodiment

As described above, the secondary air is supplied to the exhaust port 12 when the exhaust gas returns from the exhaust port 12 to the combustion chamber 74a in the present preferred embodiment. In this case, the exhaust gas that returns from the exhaust port 12 to the combustion chamber 74a causes the secondary air to be efficiently supplied to the combustion chamber 74a. This improves the charging efficiency of the engine 7 (FIG. 2), thereby improving the combustion efficiency. As a result, the output characteristics of the engine 7 can be improved while HC (hydrocarbon) and CO (carbon monoxide) in the exhaust gas can be reduced.

In addition, since air is supplied from both the intake port 9 and the exhaust port 12 to the combustion chamber 74a, the air can be evenly dispersed in the combustion chamber 74a. This enables stable combustion of the air-fuel mixture and stabilizes the output of the engine 7.

Since the secondary air is supplied so as to be mixed with the exhaust gas, HC and CO in the exhaust gas can be efficiently oxidized. This allows the exhaust gas to be efficiently purified.

Since the secondary air is supplied to the exhaust port 12 in synchronization with the return period of the exhaust gas, the secondary air can be reliably taken into the combustion chamber 74a. This prevents excessive oxygen from flowing into the catalyst device 13a. As a result, the purification efficiency of the catalyst device 13a can be sufficiently improved.

Other Examples of the Secondary Air Supply Period

While the secondary air is supplied to the exhaust port 12 in synchronization with the return period on the retarded side (see FIG. 3) in the foregoing description, the supply period of the secondary air is not limited to that in the foregoing example.

For example, the secondary air may be supplied to the exhaust port 12 in a period of time from an arbitrary point in time between the return period on the advanced side (see FIG. 3) and the return period on the retarded side to an ending point of the return period on the retarded side. In addition, the secondary air may be supplied to the exhaust port 12 in a time period from a point in time at which the lift amount of the exhaust valve 78 becomes the maximum value to a point in time at which the exhaust valve 78 is closed. The secondary air may be supplied to the exhaust port 12 in a time period from a point in time at which the lift amount of the exhaust valve 78 reaches about half the maximum lift amount to the point in time at which the exhaust valve 78 is closed. The secondary air may be supplied to the exhaust port 12 in a time period from a starting point of the return period on the advanced side to the point in time at which the exhaust valve 78 is closed.

In these cases, HC and CO in the exhaust gas flowing out of the combustion chamber 74a can be reliably oxidized before the return period on the retarded side. Accordingly, the combustion efficiency of the engine 7 can be improved while the exhaust gas can be reliably purified.

Still Other Examples of the Secondary Air Supply Period

A plurality of different secondary air supply periods may be set depending on a state of the engine 7. For example, the return period on the retarded side described above may be a first supply period, and the time period during which the exhaust valve 78 is opened may be a second supply period. In this case, the first and second supply periods are selectively used to supply the secondary air, so that a purification rate of the exhaust gas and the combustion efficiency of the engine 7 can be sufficiently improved in a wide range of driving conditions.

First, effects of supplying the secondary air to the exhaust port 12 in the second supply period are described.

Figure 5:
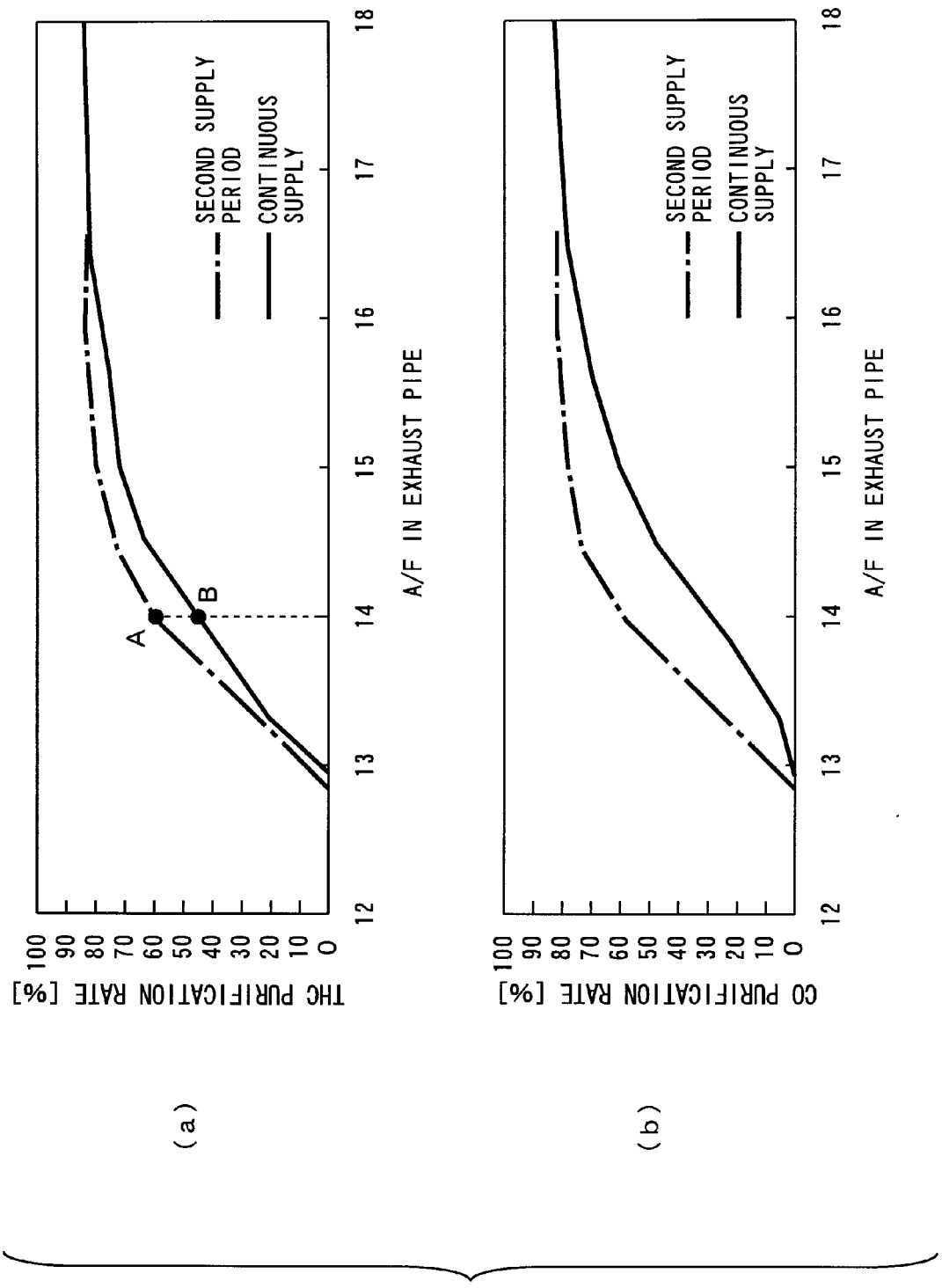
FIG. 5 is a diagram showing purification rates of THC (total hydrocarbons) and CO when an air-fuel ratio in an exhaust pipe is changed by adjusting an amount of secondary air supplied to an exhaust port.

FIG. 5 is a diagram showing purification rates of THC and CO when the air-fuel ratio in the exhaust pipe 13 is changed by adjusting the amount of the secondary air supplied to the exhaust port 12. In FIG. 5, (a) shows the purification rate of THC and (b) shows the purification rate of CO. In the example shown in FIG. 5, the amount of the air taken into the combustion chamber 74a is adjusted so that the air-fuel ratio in the combustion chamber 74a becomes about 13.

In each of FIGS. 5(a) and 5(b), the ordinate indicates the purification rate, and the abscissa indicates the air-fuel ratio in the exhaust pipe 13. The one-dot and dash line indicates the purification rate when the secondary air is supplied to the exhaust port 12 in the second supply period, and the solid line indicates the purification rate when the secondary air is continuously supplied to the exhaust port 12.

Note that the purification rate in FIG. 5 is a value indicating a ratio of THC or CO purified by oxidation in the exhaust port 12 and the exhaust pipe 13 to THC or CO included in the exhaust gas exhausted from the combustion chamber 74a. For example, when the purification rate of THC is 70%, 70% of THC included in the exhaust gas exhausted from the combustion chamber 74a is purified by oxidation.

In addition, a total amount of the secondary air supplied to the exhaust port 12 in periods of four strokes (an intake stroke, a combustion stroke, an expansion stroke, and an exhaust stroke) of the engine 7 is the same when the secondary air is supplied to the exhaust port 12 in the second supply period (the value indicated by the one-dot and dash line) and when the secondary air is continuously supplied to the exhaust port 12 (the value indicated by the solid line). For example, the total amount of the secondary air supplied to the exhaust port 12 during the periods of the four strokes of the engine 7 when the purification rate of THC is the value at the point A of FIG. 5(a) is equal to the total amount of the secondary air supplied to the exhaust port 12 during the periods of the four strokes of the engine 7 when the purification rate of THC is the value at the point B.

As shown in FIG. 5, when the secondary air is supplied to the exhaust port 12 in the second supply period, the purification rates of THC and CO are higher than those when the secondary air is continuously supplied to the exhaust port 12. This indicates that the supply of the secondary air to the exhaust port 12 in the second supply period allows the exhaust gas to be sufficiently purified.

Next, a method for selecting the first and second supply periods is described.

FIG. 6 is a diagram showing a relationship between the output torque and the rotational speed of the engine 7 when the throttle valve 32 is fully opened. In FIG. 6, the ordinate indicates the output torque of the engine 7, and the abscissa indicates the rotational speed of the engine 7. The dotted line indicates the output torque of the engine 7 when the secondary air is continuously supplied to the exhaust port 12, and the solid line indicates the output torque of the engine 7 when the secondary air is not supplied.

In the example shown in FIG. 6, the output torque of the engine 7 is larger when the secondary air is supplied to the exhaust port 12 in a state where the rotational speed of the engine 7 is about 2000 rpm and in a range from about 3000 rpm to about 4500 rpm. This is probably because a sufficient amount of the secondary air is taken into the combustion chamber 74a and the combustion efficiency of the engine 7 is improved when the rotational speed of the engine 7 is about 2000 rpm and in the range of about 3000 rpm to about 4500 rpm.

That is, it is considered that the exhaust gas suitably returns from the exhaust port 12 to the combustion chamber 74a when the rotational speed of the engine 7 is about 2000 rpm and in the range of about 3000 rpm to about 4500 rpm. Thus, it is considered that the supply of the secondary air in the first supply period reliably improves the combustion efficiency of the engine 7 when the rotational speed of the engine 7 is about 2000 rpm and in the range of about 3000 rpm to about 4500 rpm.

Meanwhile, there is no large difference in the output torque of the engine 7 between when the secondary air is supplied to the exhaust port 12 and when the secondary air is not supplied to the exhaust port 12 in a state where the rotational speed of the engine 7 is about 2500 rpm and in a region of not less than about 5000 rpm. This is probably because substantially no exhaust gas returns from the exhaust port 12 to the combustion chamber 74a when the rotational speed of the engine 7 is about 2500 rpm and in the region of not less than about 5000 rpm. Thus, it is considered that the supply of the secondary air in the second supply period allows HC and CO of the exhaust gas successively exhausted from the combustion chamber 74a to be efficiently oxidized when the rotational speed of the engine 7 is about 2500 rpm and in the region of not less than about 5000 rpm.

As described above, the suitable supply period is selected from the first and second supply periods depending on the state of the engine 7 to supply the secondary air, so that the purification rate of the exhaust gas and the output torque of the engine 7 can be sufficiently improved in the wide range of driving conditions of the engine 7.

Still other Examples of the Secondary Air Supply Period

The supply period of the secondary air may be based on the relationship between the output torque and the rotational speed of the engine 7.

Figure 7:
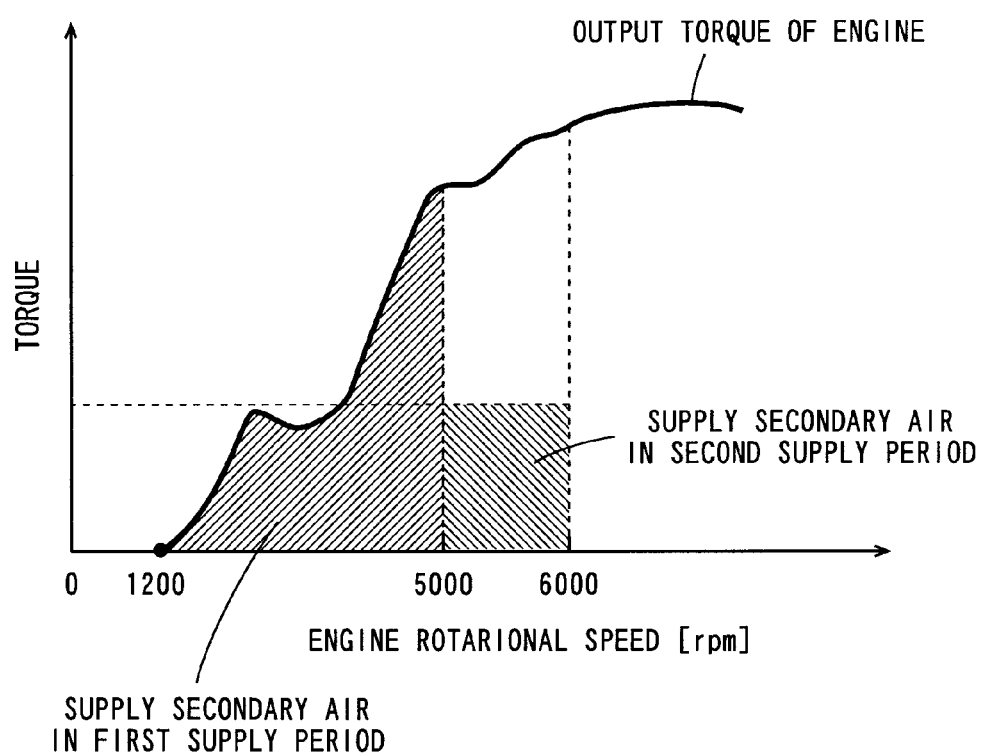
FIG. 7 is a diagram showing an example of a relationship between a driving state of the engine and first and second supply periods.

FIG. 7 is a diagram showing an example of the relationship between the driving state of the engine 7 and the above-described first and second supply periods. In FIG. 7, the ordinate indicates the output torque of the engine 7 and the abscissa indicates the rotational speed of the engine 7.

In this example, in the driving condition where the rotational speed of the engine 7 is from about 1200 rpm to about 5000 rpm, the secondary air is supplied to the exhaust port 12 in the first supply period as shown in FIG. 7. Here, in the engine 7 of the motorcycle 100, the overlapping period of the intake valve 77 and the exhaust valve 78 is not less than about 50° in some cases. This easily causes the exhaust gas to return from the exhaust port 12 to the combustion chamber 74a when the rotational speed of the engine 7 is an intermediate or low speed. In this case, the supply of the secondary air to the exhaust port 12 during the first supply period allows the secondary air to be efficiently taken into the combustion chamber 74a. This allows the combustion efficiency of the engine 7 to be improved when the rotational speed of the engine 7 is an intermediate or low speed. As a result, the exhaust gas can be sufficiently purified while the driving performance of the motorcycle 100 can be improved.

Moreover, in the driving condition where the rotational speed of the engine 7 is in a range from about 5000 rpm to about 6000 rpm and the output torque is not more than a predetermined value, the secondary air is supplied to the exhaust port 12 during the second supply period in this example. In this case, the exhaust gas can be sufficiently purified by the secondary air when the rotational speed of the engine 7 is a high speed.

Furthermore, the secondary air is not supplied in a driving condition where the engine 7 is rotated at a high speed and outputs high power. In this case, the catalyst device 13a can be prevented from being heated to a high temperature by excessive oxygen that flows thereinto. This reliably improves durability of the catalyst device 13a.

Note that the relationship shown in FIG. 7 is stored in the RAM 164 of the ECU 16, for example. In this case, the CPU 162 of the ECU 16 can determine the supply period of the secondary air based on a detected value of a torque sensor (not shown) provided in the engine 7, the detected value (the rotational speed) of the crank angle sensor 35 and the foregoing relationship stored in the RAM 164.

Moreover, the relationship shown in FIG. 7 may be stored in the RAM 164 as a relationship between the rotational speed and the throttle opening of the engine 7. In this case, the CPU 162 can determine the supply period of the secondary air based on the detected value of the throttle sensor 33, the detected value of the crank angle sensor 35, and the relationship stored in the RAM 164.

Note that the secondary air may be supplied in a driving condition where the rotational speed of the engine 7 is outside of a range from about 1200 rpm to about 6000 rpm.

Other Preferred Embodiments

While the case where the engine 7 is preferably provided in the motorcycle 100 is described in the foregoing preferred embodiment, the engine 7 may be provided in another vehicle such as a three-wheeled vehicle or a four-wheeled vehicle.

A boost sensor may be provided in the intake port 9 or the throttle body 10 and detect an intake amount of the engine 7. In this case, the intake amount can be more accurately detected when the engine 7 is in a low-load state. This easily brings the air-fuel ratio in the exhaust pipe 13 close to the target air-fuel ratio. As a result, the output characteristics of the engine 7 can be more easily improved. In addition, the purification efficiency of the catalyst device 13a can be further improved by setting the target air-fuel ratio to the theoretical air-fuel ratio, for example.

The detected value of the boost sensor is further considered when the secondary air supply period (the electromagnetic valve open period) is determined, so that a more suitable secondary air supply period can be determined.

While the supply of the secondary air from the air pump 72 to the exhaust port 12 is electrically started and stopped by using the electromagnetic valve 34 in the above-described preferred embodiment, the supply of the secondary air from the air pump 72 to the exhaust port 12 may be mechanically started and stopped.

Figure 8:
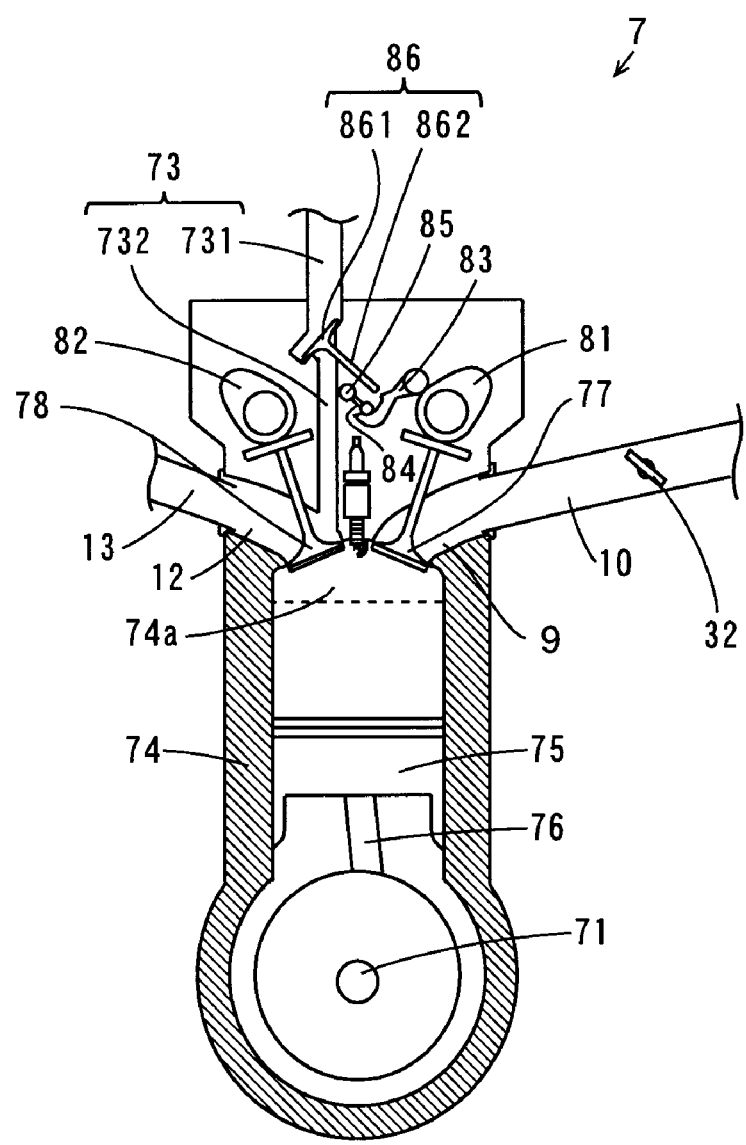
FIG. 8 is a diagram showing an example of a configuration for mechanically starting and stopping supply of secondary air from an air pump to the exhaust port.
Figure 9:
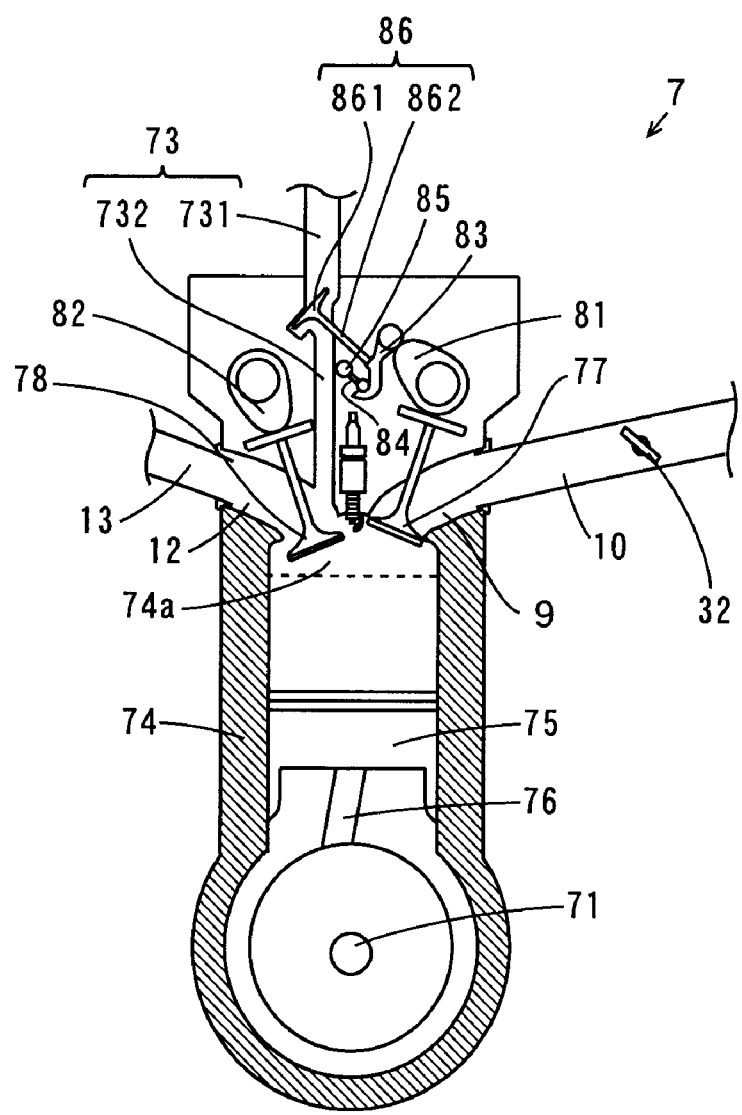
FIG. 9 is a diagram showing an example of the configuration for mechanically starting and stopping the supply of the secondary air from the air pump to the exhaust port.
Figure 10:
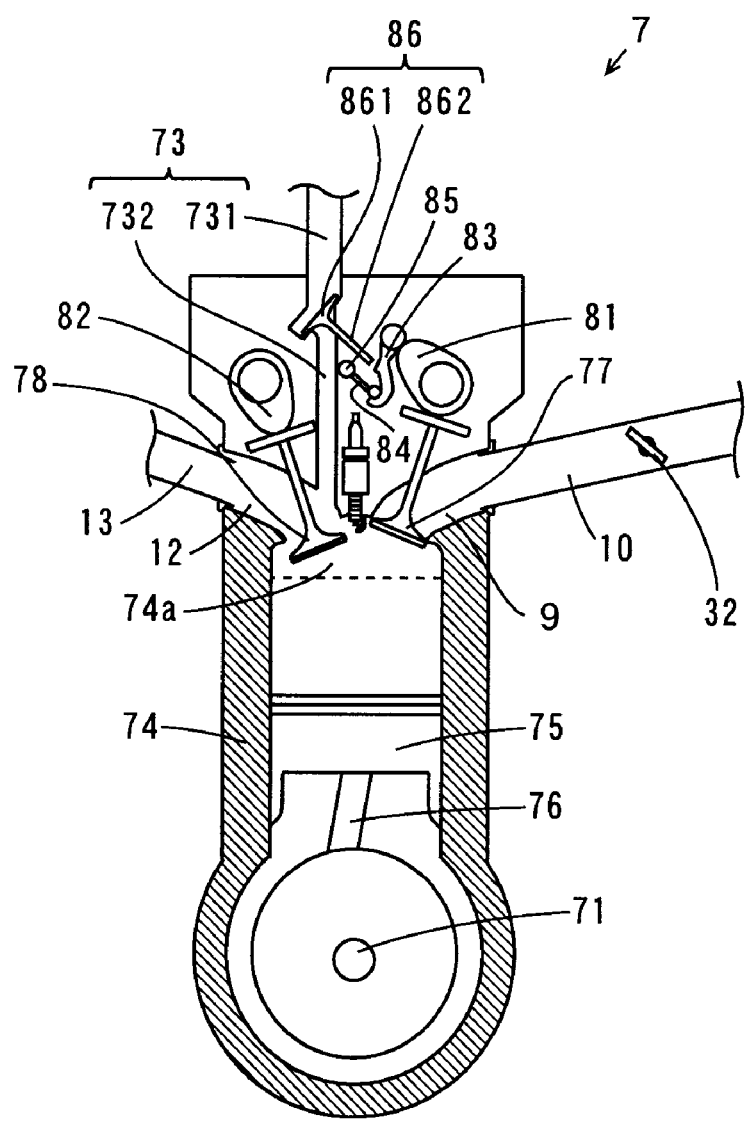
FIG. 10 is a diagram showing an example of the configuration for mechanically starting and stopping the supply of the secondary air from the air pump to the exhaust port.

FIGS. 8 to 10 are diagrams showing an example of a configuration for mechanically starting and stopping the supply of the secondary air from the air pump 72 to the exhaust port 12.

As shown in FIGS. 8 to 10, the engine 7 in the present preferred embodiment preferably includes an intake cam 81, an exhaust cam 82, a rocker arm 83, a push rod 84, a hydraulic actuator 85, and a secondary air adjusting valve 86. The secondary air supply pipe 73 includes a first supply pipe 731 on the side of the air pump 72 and a second supply pipe 732 on the side of the exhaust port 12.

The intake cam 81 and the exhaust cam 82 are rotated by a torque transmitted by a transmission mechanism (not shown) of the crankshaft 71. The rotation of the intake cam 81 and the exhaust cam 82 drives the intake valve 77 and the exhaust valve 78.

One end of the rocker arm 83 abuts against an outer peripheral surface of the intake cam 81. The tip of the push rod 84 abuts against the other end of the rocker arm 83. The rocker arm 83 turns at the tip of the push rod 84 as a rotation center in synchronization with the rotation of the intake cam 81.

The push rod 84 is arranged so as to move in the back-and-forth direction along the direction of its axis and driven by the hydraulic actuator 85. Note that FIGS. 8 and 9 show a state where the push rod 84 is not pressed outward by the hydraulic actuator 85, and FIG. 10 shows a state where the push rod 84 is pressed outward by the hydraulic actuator 85.

The secondary air adjusting valve 86 includes a disk portion 861 and a shaft portion 862. The disk portion 861 is provided at one end of the shaft portion 862. The intake cam 81 rotates to periodically change a state of the other end of the shaft portion 862 and a center portion of the rocker arm 83 between a state where they are spaced apart from each other (FIG. 8) and a state where they abut against each other (FIG. 9).

The shaft portion 862 is biased by an energizing member (not shown) toward the side of the rocker arm 83 in its axis direction. Thus, when the shaft portion 862 and the rocker arm 83 are spaced apart from each other, the disk portion 861 closes a portion that communicates the first supply pipe 731 and the second supply pipe 732 as shown in FIG. 8. As a result, the supply of the secondary air from the air pump 72 to the exhaust port 12 is blocked.

As shown in FIG. 9, the shaft portion 862 is pressed by the rocker arm 83 to move the disk portion 861, so that the first supply pipe 731 and the second supply pipe 732 are in communication with each other. This causes the secondary air to be supplied from the air pump 72 to the exhaust port 12.

As shown in FIG. 10, when the push rod 84 is pressed outward by the hydraulic actuator 85, the shaft portion 862 and the rocker arm 83 are maintained in the state where they are spaced apart from each other irrespective of a rotation position of the intake cam 81. Therefore, when the push rod 84 is pressed outward, the portion that communicates the first supply pipe 731 and the second supply pipe 732 is maintained in a closed state by the disk portion 861. Accordingly, the supply of the secondary air to the exhaust port 12 can be continuously stopped by actuating the hydraulic actuator 85 in the present preferred embodiment.

As described above, the supply of the secondary air from the air pump 72 to the exhaust port 12 can be started and stopped by utilizing the rotation of the intake cam 81 in the present preferred embodiment. That is, the supply of the secondary air can be mechanically started and stopped in the present preferred embodiment. This reduces the production cost of the engine 7, as compared to the case where the electromagnetic valve 34 is provided.

In the above-described preferred embodiment, the secondary air supply pipe 73 and the electromagnetic valve 34 are examples of an air supply mechanism, the rear wheel 18 is an example of a drive wheel, the transmission, the chain 20, and the rear wheel driven sprocket 19 are examples of a transmission mechanism.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An engine comprising:
   a cylinder including a combustion chamber;
   an exhaust port including an opening into the combustion chamber arranged to exhaust a combustion gas that is in the combustion chamber;
   an exhaust valve provided at the opening of the exhaust port and arranged to open the opening during a first time period and close the opening during a second time period;
   an air supply mechanism arranged to supply air to the exhaust port; and
   a controller programmed to control the air supply mechanism to, during the first time period, not supply air to the exhaust port until a lift amount of the exhaust valve reaches half a maximum value, and to supply air to the exhaust port during a predetermined time period after a point in time at which the lift amount of the exhaust valve reaches half the maximum value.

2. The engine according to claim 1, wherein the air supply mechanism is arranged to supply air to the exhaust port during a predetermined time period after a point in time at which the lift amount of the exhaust valve reaches the maximum value.

3. The engine according to claim 1, wherein the air supply mechanism is arranged to supply air to the exhaust port when the combustion gas flows from the exhaust port to the combustion chamber.

4. The engine according to claim 1, wherein the air supply mechanism is arranged to supply air to the exhaust port when a pressure in the exhaust port is higher than a pressure in the combustion chamber.

5. The engine according to claim 1, further comprising an exhaust pipe coupled to a downstream end of the exhaust port, and a catalyst device provided in the exhaust pipe.

6. The engine according to claim 1, wherein the air supply mechanism is arranged to supply air to the exhaust port until the first time period has ended.

7. A vehicle comprising:
   a drive wheel;
   an engine; and
   a transmission mechanism arranged to transmit power generated by the engine to the drive wheel; wherein
   the engine includes:
      a cylinder including a combustion chamber;
      an exhaust port including an opening into the combustion chamber arranged to exhaust a combustion gas that is in the combustion chamber;
      an exhaust valve provided at the opening of the exhaust port, and arranged to open the opening during a first time period and close the opening during a second time period;
      an air supply mechanism arranged to supply air to the exhaust port; and
      a controller programmed to control the air supply mechanism to, during the first time period, not supply air to the exhaust port until a lift amount of the exhaust valve reaches half a maximum value, and to supply air to the exhaust port during a predetermined time period after a point in time at which the lift amount of the exhaust valve reaches half the maximum value.

* * * * *